March 6, 1934.  J. A. STREUN  1,949,766
COTTON SEPARATOR
Filed March 24, 1932   2 Sheets-Sheet 1

John A. Streun Inventor
Jesse R. Stone
&
Lester B. Clark
By
Attorney

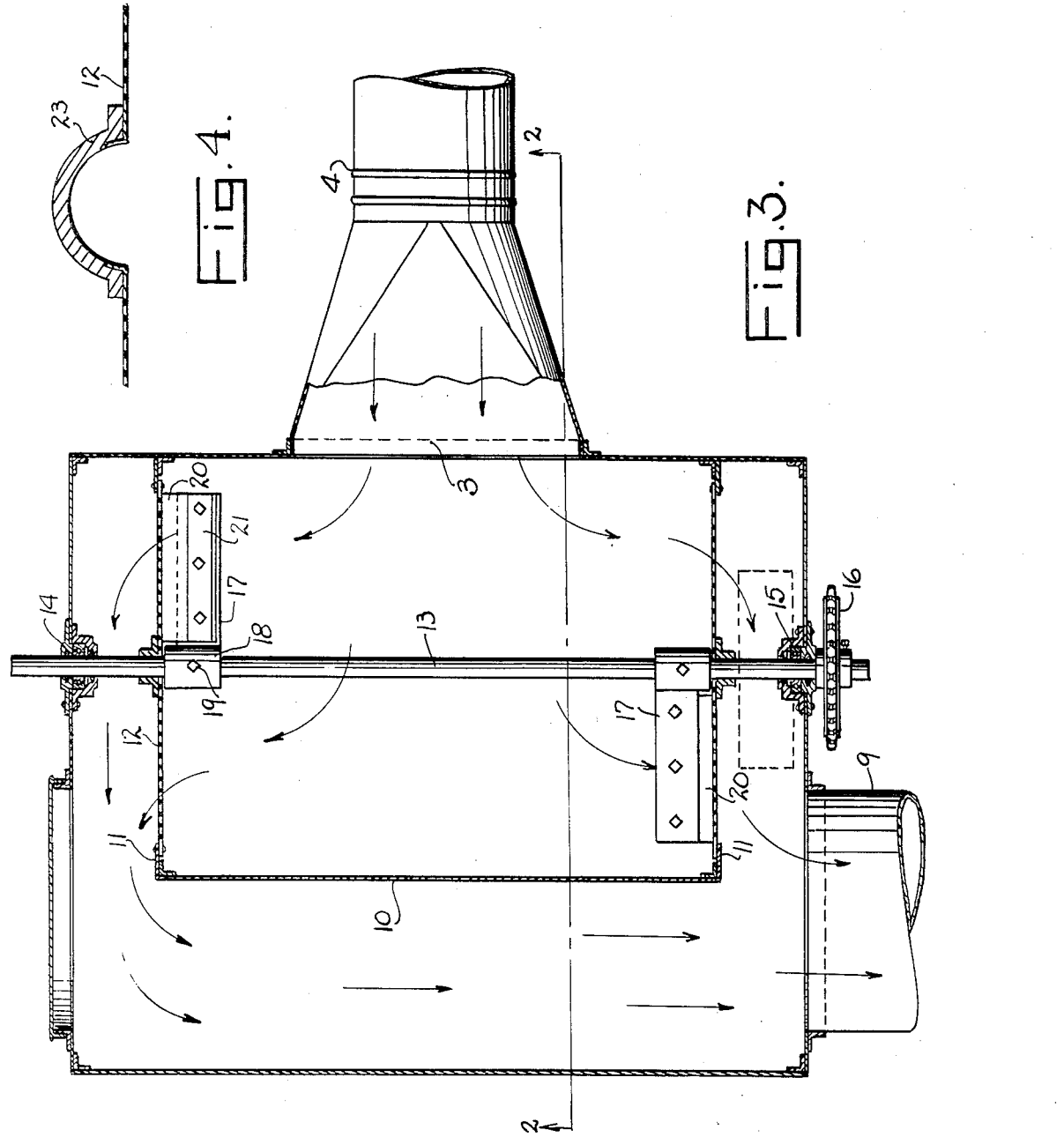

Patented Mar. 6, 1934

1,949,766

UNITED STATES PATENT OFFICE 1,949,766

COTTON SEPARATOR

John Arnold Streun, Sherman, Tex., assignor to Hardwicke-Etter Company, Sherman, Tex., a corporation Application March 24, 1932, Serial No. 600,886

8 Claims. (Cl. 19—75)

My invention relates to cotton separators in which the cotton is elevated from the wagon to the gin or some place of storage by a suction device.

It is an object of the invention to provide an effective type of separator to engage the cotton, move it from the suction line and deliver it toward the cleaners or the gin.

The construction involves a means for keeping the suction line open so that the draft of air through the separator may be effective at all times.

I desire to provide a perforated baffle through which the air passes to the suction fan which will stop the passage of the cotton, and to provide means for removing the cotton from the perforated baffle.

I also provide a means for removing cotton lint from the wiping devices so that they will not clog in use.

Invention resides largely in the particular structure and arrangement of the parts of the separator whereby simple and efficient types of devices for this purpose are obtained.

In the drawings herewith, Fig. 1 shows a side elevation of a separator involving the invention.

Fig. 3 is a horizontal section taken adjacent the upper end of the device.

Fig. 4 is a section taken on the line 4—4 of Fig. 2 somewhat enlarged.

Figure 1:
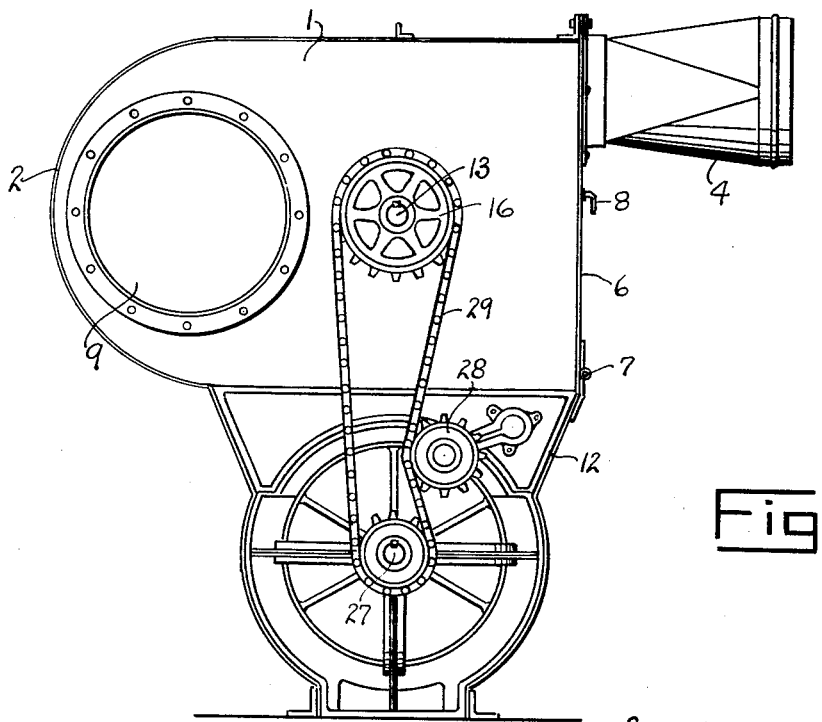

In the carrying out of my invention I provide a housing 1 shaped to accommodate the working parts of the invention. It will be seen from Figs. 1 and 2 that the housing may be of sheet metal or similar material, the forward side thereof being rectangular in general construction while the rearward side is rounded at 2 or the arc of the circle. At the forward upper end of the housing is an opening 3 connecting with the chute 4 through which the cotton is drawn to the separator. It is to be understood that the forward end 5 of the chute is connected to a flexible suction flue which may be dropped into the wagon with which the cotton is transported to the gin, and through which said cotton may be conducted to the separator.

On the forward side below the inlet chute I provide a door 6 hinged at 7 and provided at its upper edge with a latch 8. This door may be moved downwardly as shown by the dotted lines to allow access to the interior of the housing for purposes of repair or adjustment.

Toward the rearward end of the housing is a lateral outlet 9 which as seen in Fig. 3 conducts the air from the separator and is understood to be connected to a suction fan by which the draft through the separator is caused.

Figure 2:
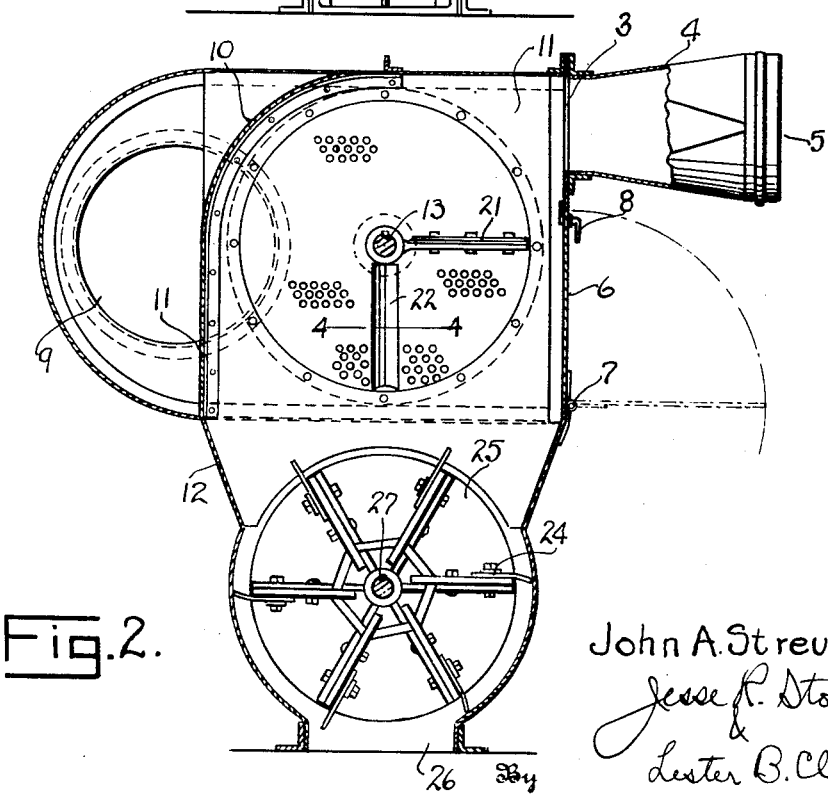
Fig. 2 is a similar view with the parts in section on the line 2—2 of Fig. 3.

Between the ends of the housing there is an interior partition 10 which, as seen in Fig. 2, is rounded on its upper side on the arc of a circle and is extended downwardly at 11 to connect with the cotton outlet shown at 12. This wall 10 extends short of each end of the housing as will be noted in Fig. 3 and connects at its ends with the end walls 11. Each of the end walls has a circular foraminated baffle 12 which serves as a separating wall to retain the cotton within the inner chamber bounded by the wall 10 and the end walls 11. It will be noted from Fig. 3 that the air drawn into the housing by the suction fan circulates outwardly through the end baffles and from there to the outlet flue 9.

I provide a rotatable shaft 13 centrally of the perforated baffles 12. The shaft extends beyond the ends of the inner chamber and has bearings in the side walls of the housing at 14 and 15. At its ends the shaft 13 projects beyond the housing and a sprocket wheel 16 or some similar power connection is mounted upon one of the projecting ends. Within the inner chamber the shaft is provided with wiping arms 17. These arms are mounted one at each end in position adjacent the perforated baffles, one arm projecting in one direction from the shaft and the other in the opposite direction. Said arms are radial to the shaft and include a sleeve 18 fixed to the shaft by means of a set screw 19 or other similar means, and project from the shaft a distance sufficient to wipe the entire surface of the perforated baffles.

A flexible wiping member 20 is secured to the arm by means of a plate 21 bolted to the arm. The wiper has its outer wiping edge in close contact with the inner wall of the adjacent perforated baffle and it will be noted that as the shaft is rotated the wiper will wipe the entire inner surface of the adjacent baffle at each rotation of the shaft.

In order that the wiper may not clog with lint while continuously wiping the surface of the baffle, I provide a releasing pocket shown at 22 in Fig. 2. This pocket extends from below the shaft 13 radially down to the edge of the baffle. As shown in Fig. 4 this pocket is constructed by providing a slotted opening in the wall 12 and attaching to the margins of the opening a semicylindrical imperforate wall 23. Thus when the wiper with cotton lint engaged under the wiping edge thereof moves past the pocket within the wall of the baffle, the cotton adhering to the wiping edge will be released and the draft of air past the edge thereof will assist in disengaging the lint therefrom so that it will be removed.

Below the inner chamber bounded by the wall 10 the housing is open downwardly to connect with the outlet chute 12. The usual rotating closure 24 is provided in the outlet chute to form a seal across the chute to prevent a suction of air therethrough, but which is adapted to engage the cotton in the chute 25 between the sealing arms 24 and carry it around with the rotating seal member to discharge it downwardly through the outlet 26 to the cleaners. This discharge member is of common construction and forms no part of my present invention.

From Fig. 1 it will be seen that a rotation of the shaft 27 upon which the arms 24 are mounted, will communicate rotation also to the sprocket wheel 16 on the shaft 13. I provide an idler 28 mounted on the housing to engage the sprocket chain 29 and adjust the tension thereon in the usual manner.

The advantage of my improvement lies particularly in the effective manner in which the suction through the separator is maintained at maximum efficiency. The wiper keeps the perforated baffle open at all times so that the draft of air therethrough is unimpeded. The wipers are prevented from clogging, through the releasing pockets provided in the baffle so that no obstructing of the openings will occur. It is to be understood, of course, that the main charge of cotton drawn into the separator will strike against the rearward wall 10 of the compartment and drop downwardly to the outlet. Occasional lumps of cotton will, however, be drawn against the end baffles but these will be wiped loose and moved downwardly toward the outlet by the rotating wiper arms. The advantages of this construction will be obvious to those skilled in the art.

Having described my invention, what I claim is:

1. A cotton separator including a housing, a suction line through said housing including inlet and outlet flues, connected with said housing, a cotton-receiving chamber connected with said inlet, foraminated walls on said chamber, means to remove cotton lint from said foraminated walls including a wiping arm and means to free said wiping arm from lint adhering thereto.

2. A cotton separator including a housing, an air inlet and an air outlet thereto, a chamber in said housing connected with said inlet, foraminated baffles in the walls of said chamber, wiping arms contacting with said baffles, means to move said arms to remove lint from said baffles, said baffles having recesses therein over which said arms may pass to free themselves of lint.

3. A cotton separator including a housing having air inlet and outlet ports therein, a separating chamber in said housing into which said inlet port connects, perforated baffles at each end of said chamber, a shaft rotatable axially of said chamber, said baffles having radial recesses therein extending away from said shaft, and wiping arms on said shaft adapted to remove lint from said baffles.

4. A cotton separator including a housing having air inlet and outlet ports therein, a separating chamber in said housing into which said inlet port connects, perforated baffles at each end of said chamber, a shaft rotatable axially of said chamber, arms on said shaft adapted to wipe lint from said baffles, imperforate outwardly curved troughs in said baffles to relieve contact of the wiping arms with said baffles for the purpose stated.

5. A cotton separator including a housing means to conduct a draft of air through said housing, baffles through which said air must pass, means to wipe said baffles free of lint and means to free said lint from said wiping means.

6. A cotton separator including a housing means to conduct a draft of air through said housing, baffles through which said air must pass, means to wip said baffles free of lint including wiping arms adapted to traverse said baffles and recesses in said baffles to allow lint to be released from said arms.

7. A cotton separator including a housing, inlet and outlet air connections thereon, a cotton receiving chamber therein connecting with said inlet, end perforated baffles on said chamber, rotatable means closing the lower end of said chamber to carry the cotton therefrom, and means to wipe the ends of said chamber and remove lint from said baffles to said rotatable means.

8. A cotton separator including a housing, a suction line through said housing including inlet and outlet flues connected with said housing, a cotton receiving chamber connected with said inlet, foraminated walls on the ends of said chamber spaced from the walls of said housing, means to wipe the cotton from said walls, and means below said chamber acting to close the passage of air from below said chamber to said housing and to receive and to move the cotton from said chamber.

JOHN ARNOLD STREUN.